United States Patent
Rosenberg

(10) Patent No.: US 7,966,406 B2
(45) Date of Patent: Jun. 21, 2011

(54) SUPPORTING A RESPONSE TO A MID-DIALOG FAILURE

(75) Inventor: Jonathan D. Rosenberg, Freehold, NJ (US)

(73) Assignee: Cisco Technology, Inc., San Jose, CA (US)

( * ) Notice: Subject to any disclaimer, the term of this patent is extended or adjusted under 35 U.S.C. 154(b) by 368 days.

(21) Appl. No.: 11/832,392

(22) Filed: Aug. 1, 2007

(65) Prior Publication Data

US 2008/0040508 A1 Feb. 14, 2008

Related U.S. Application Data

(60) Provisional application No. 60/821,069, filed on Aug. 1, 2006.

(51) Int. Cl.
*G06F 15/16* (2006.01)
*H04W 36/00* (2009.01)

(52) U.S. Cl. ........ 709/227; 709/225; 709/229; 709/239; 370/351; 455/436

(58) Field of Classification Search .................. 709/227, 709/239

See application file for complete search history.

(56) References Cited

U.S. PATENT DOCUMENTS

| | | | | |
|---|---|---|---|---|
| 6,992,974 | B1* | 1/2006 | Tripathi | 370/216 |
| 7,543,061 | B2* | 6/2009 | Kumbalimutt et al. | 709/226 |
| 7,664,500 | B2* | 2/2010 | Chou et al. | 455/436 |
| 2004/0003058 | A1 | 1/2004 | Trossen | 709/220 |
| 2005/0015492 | A1* | 1/2005 | Kumbalimutt et al. | 709/226 |
| 2005/0015499 | A1 | 1/2005 | Mayer | 709/228 |
| 2005/0228884 | A1* | 10/2005 | Hawley | 709/225 |
| 2006/0036747 | A1* | 2/2006 | Galvin et al. | 709/228 |
| 2006/0089991 | A1 | 4/2006 | Sanders et al. | 709/227 |
| 2007/0130461 | A1* | 6/2007 | Chou et al. | 713/168 |

OTHER PUBLICATIONS

PCT Notification of Transmittal of the International Search Report and the Written Opinion of the International Searching Authority, or the Declaration with attached PCT International Search Report and Written Opinion of the International Searching Authority in International Application No. PCT/US07/74966, dated Jul. 7, 2008, 7 pages.
Johns, K., "*Routing of mid dialog requests using sip-outbound*", SIP, Internet Draft, http://tools.ietf.org/html/draft-johns-sip-outbound-middialog-draft, 16 pages, Jun. 17, 2006.
Johns, K., "*Routing of mid dialog requests using sip-outbound*", SIP, Internet Draft, Intended status: Standards Track, http://tools.ietf.org/html/draft-johns-sip-outbound-middialog-draft-01, 17 pages, Oct. 22, 2006.
Johns, K., "*Routing of mid dialog requests using sip-outbound*", SIP, Internet Draft, Intended status: Standards Track, http://tools.ietf.org/html/draft-johns-sip-outbound-middialog-draft-02, 18 pages, Jan. 31, 2007.
State Intellectual Property Office of the People's Republic of China, The First Office Action, Application No. 200780027564.2, transmitted to Baker Botts L.L.P. by foreign associate on Jul. 5, 2010, 6 pages (English and Chinese), Jul. 5, 2010.

* cited by examiner

*Primary Examiner* — Ashok B Patel
*Assistant Examiner* — Linglan Edwards
(74) *Attorney, Agent, or Firm* — Baker Botts L.L.P.

(57) ABSTRACT

In one embodiment, supporting outbound proxy discovery includes receiving a first registration request at a home proxy, where the first registration request is received from a user agent. An outbound proxy set is assigned to the user agent. The outbound proxy set includes outbound proxies. An outbound proxy set identifier is inserted into a first registration response for the user agent. The outbound proxy set identifier allows the user agent to identify the plurality of outbound proxies.

11 Claims, 2 Drawing Sheets

SUPPORTING A RESPONSE TO A MID-DIALOG FAILURE

RELATED APPLICATION

This application claims benefit under 35 U.S.C. §119(e) of U.S. Provisional Application Ser. No. 60/821,069, entitled "SUPPORTING HIGH AVAILABILITY AND PROXY DISCOVERY WITH SIP OUTBOUND," filed Aug. 1, 2006, by J. Rosenberg.

TECHNICAL FIELD

The present disclosure relates generally to communication networks.

BACKGROUND

A user agent of a communication network may establish a communication dialog through Session Initiation Protocol (SIP) proxies. In certain cases, a proxy may fail during a dialog, which may disrupt the communication. Known techniques for responding to such failures are not satisfactory in certain situations.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION

Overview

According to the teachings of the present disclosure, supporting outbound proxy discovery includes receiving a first registration request at a home proxy, where the first registration request is received from a user agent. An outbound proxy set is assigned to the user agent. The outbound proxy set includes outbound proxies. An outbound proxy set identifier is inserted into a first registration response for the user agent. The outbound proxy set identifier allows the user agent to identify the plurality of outbound proxies.

According to the teachings of the present disclosure, responding to a mid-dialog failure includes performing the following for each outbound proxy of an outbound proxy set: establishing a flow between a user agent and a home proxy through an outbound proxy; and maintaining a connection table for the flow, where the connection table records universal resource identifiers (URIs) accessible through the flow. An established flow associated with a target URI is determined to have failed. Another established flow associated with the target URI is identified and utilized.

Description

Figure 1:
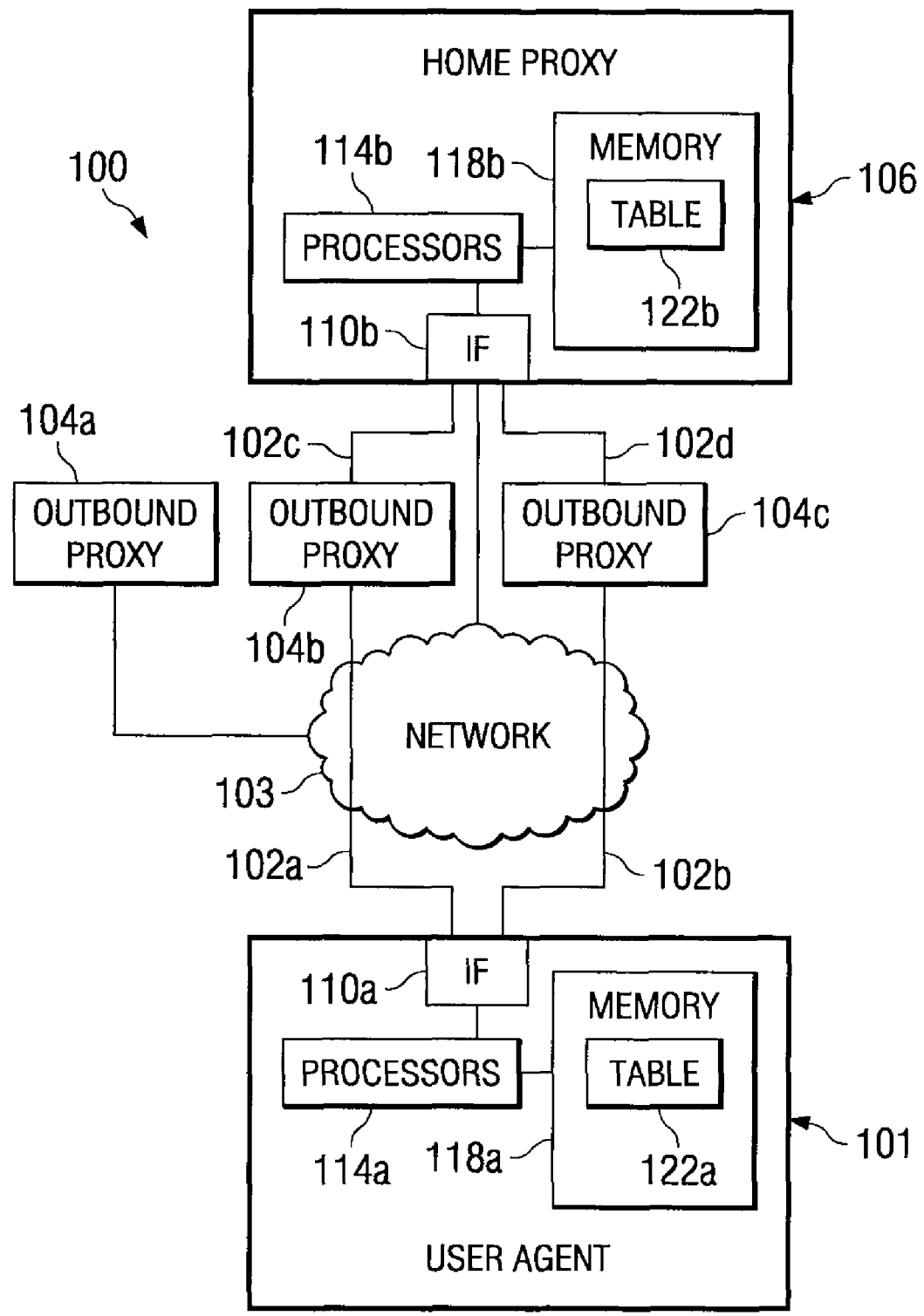
FIG. 1 illustrates an example of a portion of a communication system.

FIG. 1 is a block diagram of a portion of a communication system 100 according to one embodiment of the present disclosure. In the embodiment, system 100 includes a user agent 101, a network 103, one or more outbound proxies 104, and a home proxy 106 coupled as shown. User agent 101 has established communication flows 102a and 102b through a network 103 to outbound proxies 104b and 104c, respectively. Outbound proxies 104b and 104c have established registered communication flows 102c and 102d, respectively, to home proxy 106. User agent 101 and home proxy 106 each include a interface (IF) 110, one or more processors 114, and a memory 118 that stores one or more connection tables 122.

In general, system 100 supports outbound proxy discovery. An outbound proxy 104 may inform user agent 101 of an outbound proxy set assigned to user agent 101 for communication to home proxy 106. Home proxy 106 may also inform user agent 101 of an outbound proxy set. User agent 101 may use backup outbound proxies 104 of the outbound proxy set in case of an outbound proxy failure.

System 100 also supports a response to mid-dialog failures. User agent 101 and/or home proxy 106 may maintain connection tables 122 that support a response to mid-dialog failures. A connection table 122 records universal resource identifiers (URIs) that may be used to communicate along flows 102 between user agent 101 and home proxy 106. User agent 101 and/or home proxy 106 may use a connection table 122 to identify a backup outbound proxy 104 that may be used in case of an outbound proxy failure.

User agent 101 generally refers to any suitable device operable to communicate messages with outbound proxies 104 and/or home proxy 106. User agent 101 may include, for example, a cellular telephone, a mobile handset, a personal digital assistant (PDA), a computer such as a desktop or laptop computer, or any other suitable device operable to communicate with outbound proxies 104 and/or home proxies 106 through network 103.

A dialog is a communication between user agents 101. A dialog may include one or more sessions. A session is a communication involving user agent 101 and home proxy 106, and may involve one or more outbound proxies 104. A user agent 101 has an instance identifier that remains with user agent 101 indefinitely.

Communication flows 102 (or connections) represent communicative links between user agents 101 and outbound proxies 104 and between outbound proxies and home proxy 106. For example, a flow 102 may be a Transmission Control Protocol (TCP) connection, a User Datagram Protocol (UDP) connection, or any other suitable flow 102. A flow 102 has a flow identifier identifying the flow. A flow 102 may be used to provide broadband access, and may be reused even in the presence of an intervening network address translation between an outbound proxy 104 and home proxy 106.

User agent 101 creates a flow 102 towards an outbound proxy 104 during registration. User agent 101 may create multiple flows 102 towards different outbound proxies 104. Flow 102 is then held open by user agent 101 and outbound proxy 104. A message for user agent 101 is routed to outbound proxy 104, which routes the message to user agent 101 over the flow 102.

User agent 101 may utilize keepalive mechanism to maintain the flow 102. The keepalive mechanism may be used to detect failures of outbound proxy 104 and to initiate a new flow 102. An example of a keepalive mechanism includes the STUN (Simple Traversal Underneath NAT (Network Address Translation)) mechanism.

Network 103 generally refers to any interconnecting system capable of transmitting packets. Network 103 may comprise, for example, all or a portion of a cellular telephone network, a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

Outbound proxies 104 generally perform perimeter networking functions for system 100. For example, outbound proxies 104 may route messages to and from user agents 101 for one or more sessions. Outbound proxies 104 may be servers, routers, and/or other suitable network element. Although system 100 includes three outbound proxies 104a, 104b, and 104c, any suitable number of outbound proxies 104 may be used.

In one embodiment, user agent 101 is assigned an outbound proxy set that includes outbound proxies 104 that user agent 101 may use to communicate with home proxy 106. User agent 101 may use backup outbound proxies 104 of the outbound proxy set in case of an outbound proxy failure.

Home proxy 106 generally performs core functions for system 100. For example, home proxy 106 may access user agent 101 profiles from a database (not explicitly shown), process registrations, and/or provide location service functions. In some embodiments, home proxy 106 may be structurally similar to outbound proxies 104 and/or may perform outbound proxy 104 functions. Hence, some such embodiments may not include outbound proxies 104. Although system 100 includes a single home proxy 106, any suitable number of home proxies 106 may be used.

In one embodiment, user agent 101 and home proxy 106 store connection tables 122a and 122b, respectively. A connection table 122 associates a universal resource identifier (URI) with a flow 102 that can be used to reach the URI.

URI-flow associations may be established in any suitable manner. In one embodiment, a URI used to open a flow 102 may be associated with the flow 102. In addition, URIs from SIP service or record route header fields may be associated with flows 102. In general, a service route designates a route that user agent 101 may use to request outbound service, and a record route specifies a proxy through which mid-dialog requests are to be routed. Service routes may be received in response to a registration request, and record routes may be received in response to a dialog setup request.

In the embodiment, if the domain of a URI of a service or record route matches a URI already associated with a flow 102 used to send the registration request, the service or record route URI may be associated with the flow 102. A user agent 101 may look at the domain of the topmost URI of the record route set given by a dialog setup request or response. If the domain matches an already associated URI, user agent 101 associates the record route URI with the flow 102. A proxy may look at the domain of the next-hop URI of the record route header field. If the domain matches an already associated URI, the proxy associates the record route URI with the flow 102.

In one embodiment, URIs generated from a connection request for a flow 102 may be associated with the flow 102. For example, a proxy may receive a connection request for a flow 102, such as a TCP/TLS connection. If the client of flow 102 offers a certificate, a URI generated from the host name in the certificate may be associated with the flow 102.

To send a request to a target URI, user agent 101 or proxy searches the URI-flow associations for a flow 102 associated with the target URI. The sender may perform a longest match search by comparing the target URI with candidate URIs of the URI-flow associations. In a longest match, the URIs and opaque URI parameters match. In a next longest match, the user and domain parts match. In a least specific match, the domain parts match, but user parts do not match.

A component of system 10 may include any suitable arrangement of elements, for example, an interface, logic, memory, other suitable element, or a combination of any of the preceding. An interface receives input, sends output, processes the input and/or output, performs other suitable operation, or performs a combination of any of the preceding. An interface may comprise hardware and/or software.

Logic performs the operations of the component, for example, executes instructions to generate output from input. Logic may include hardware, software, other logic, or a combination of any of the preceding. Certain logic, such as a processor, may manage the operation of a component. Examples of a processor include one or more computers, one or more microprocessors, one or more applications, other logic, or a combination of any of the preceding.

A memory stores information. A memory may comprise computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), other computer-readable medium, or a combination of any of the preceding.

Modifications, additions, or omissions may be made to system 100 without departing from the scope of the invention. The components of system 100 may be integrated or separated. For example, home proxy 106 may include functionality of one or more outbound proxies 104 or vice versa. Moreover, the operations of system 100 may be performed by more, fewer, or other components. For example, the operations of home proxy 106 may be performed by more than one component, or the operations of outbound proxies 104a, 104b, and 104c may be performed by two or more components. Additionally, operations of system 100 may be performed using any suitable logic. As used in this document, "each" refers to each member of a set or each member of a subset of a set. Further details regarding the general operation of system 100 are explained with reference to FIG. 2.

Figure 2:
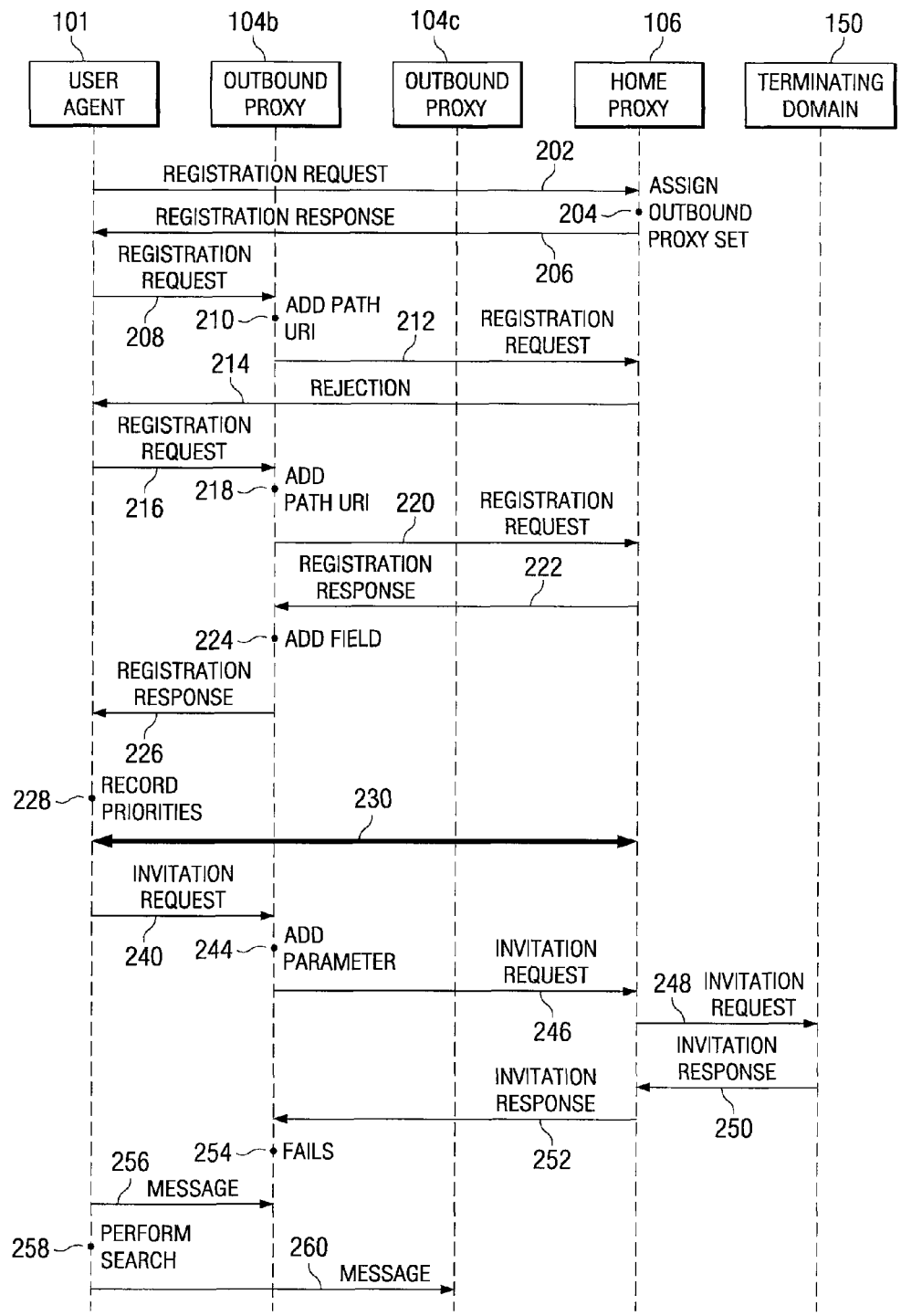
FIG. 2 illustrates an example of operations of the system of FIG. 1.

FIG. 2 is a call flow diagram illustrating example operations of the system 100 of FIG. 1 according to one embodiment of the present disclosure. Although this example explains the general operation of system 100 in the context of Session Initiation Protocol (SIP), any suitable communication protocol may be used. The examples use Transport Layer Security (TLS) connections for the flows 102. Any suitable type of connection, however, may be used.

User agent 101 opens a flow 102 with home proxy 106, and sends a registration request to home proxy 106 at step 202. The registration request has a request URI:

example.com

Home proxy 106 determines that the registration request did not come from an outbound proxy 104, and assigns outbound proxies 104a, 104b, and 104c as an outbound proxy set 104 for user agent 101 at step 204. Home proxy sends a registration response that informs user agent 101 of the outbound proxy set 104 at step 206. The registration response includes an outbound proxy set URI:

outbound.example.com that user agent 101 may use to look up outbound proxies 104a, 104b, and 104c in, for example, a Domain Name Services (DNS) Server.

User agent 101 opens a flow 102a with a selected outbound proxy 104b and sends a registration request to outbound proxy 104b at step 208. The registration request includes the request URI and a route header with the outbound proxy set URI. User agent 101 also associates the outbound proxy set URI with flow 102a, such that the user agent connection table for flow 102a includes:

outbound.example.com

Outbound proxy 104b selects a backup outbound proxy 104c, and adds a Path URI that identifies backup outbound proxy 104*c* to the registration request at step 210. The Path URI may have a user part that includes backup outbound proxy 104*c*, instance, and/or registration identifiers.

Outbound proxy 104*b* opens a flow 102*c* with home proxy 106 and sends the registration request to home proxy 106 along flow 102*c* at step 212. Outbound proxy 104*b* also associates the request URI with the flow 102*c*, such that the outbound proxy 104*b* connection table for flow 102*c* includes:

example.com

Home proxy 106 associates the outbound proxy set URI with the flow 102*c*, such that the home proxy connection table for flow 102*c* includes:

outbound.example.com

Home proxy 106 sends a rejection to user agent 101 at step 214 in order to challenge for credentials.

User agent 101 sends a new registration request with a username at step 216. User agent 101 is instructed to send the new registration request to the outbound proxy set URI. User agent 101 determines that the outbound proxy set URI is associated with flow 102*a*, and sends the new registration request along flow 102*a*.

Outbound proxy 104*b* adds a Path URI to the new registration request at step 218. The Path URI includes outbound proxy set, user name, instance, and/or registration identifiers, and may also include a keepalive indicator indicating keepalive support:

outbound proxy set identifiers+user name+instance identifier+registration identifier @outbound.example.com; keepalive indicator Outbound proxy 104*b* determines that the request URI is associated with flow 102*c*, and sends the new registration request to home proxy 106 along flow 102*c* at step 220.

Home proxy 106 sends a registration response to outbound proxy 104*b* at step 222. The service route of the registration response includes the Path URI as the topmost route and the request URI as the second route. The domain of the Path URI matches the domain of the request URI, which is associated with flow 102*c*, so home proxy 106 adds the Path URI to the home proxy connection table for flow 102*c* to yield:

outbound.example.com
    outbound proxy set identifiers+user name+instance identifier+registration identifier @outbound.example.com; keepalive indicator Outbound proxy 104*b* adds an alternative proxies header field to the registration response at step 224. The alternative proxies header field includes the address of backup outbound proxy 104*c*, and may prioritize outbound proxies 104:

outbound proxy set identifiers+user name+instance identifier+registration identifier @outbound.example.com; backup outbound proxy address Outbound proxy 104*b* forwards the registration response to user agent 101 at step 226.

User agent 101 records the priorities for outbound proxies 104 at step 228. User agent 101 adds the service route URI to the user connection table for flow 102*a* to yield:

outbound.example.com
    outbound proxy set identifiers+user name+instance identifier+registration identifier @outbound.example.com; keepalive indicator At step 230, user agent 101 establishes flow 102*d* with outbound proxy 104*c* and registers with outbound proxy 104*c* using substantially the same steps as those explained previously with reference to steps 216 through 228. Flows 102*a* and 102*b* with outbound proxies 104*b* and 104*c*, respectively, may have the same Path URI.

The user agent connection table for flow 102*b* includes:

outbound proxy set identifiers+user name+instance identifier+registration identifier @outbound.example.com; backup outbound proxy address
    outbound proxy set identifiers+user name+instance identifier+registration identifier @outbound.example.com; keepalive indicator The home proxy connection table for flow 102*d* includes:

outbound.example.com
    user name+instance identifier+registration identifier @outbound.example.com; keepalive indicator User agent 101 sends an invitation request for a dialog with a called party in a terminating domain 150 at step 240. The invitation request includes the service route with a topmost route:

outbound proxy set identifiers+user name+instance identifier+registration identifier @outbound.example.com; keepalive indicator The invitation request also includes a request URI that identifies the called party. User agent 101 searches the URI-flow associations to locate a URI that matches the request URI, and determines that the URIs associated with flows 102*a* and 102*b* match, indicating that either flow 102 may be used. User agent selects flow 102*a* and sends the invitation request to outbound proxy 104*b*. The selection may be arbitrary.

At step 244, outbound proxy 104*b* adds an opaque URI parameter to the record route:

outbound proxy set identifiers+user name+instance identifier+registration identifier @outbound.example.com; opaque URI parameter The opaque URI parameter may include SIP dialog state. Outbound proxy 104*b* forwards the invitation request to home proxy 106 along flow 102*c* at step 246 according to the record route.

Home proxy 106 forwards the invitation request to terminating domain 150 at step 248 according to the record route. Terminating domain 150 sends an invitation response to home proxy 106 at step 250.

Home proxy 106 determines that the domain of the topmost URI of the record route of the response matches the domain of the request URI associated with the flow 102*c*, so home proxy 106 adds the URI to the home proxy connection table for flow 102*c* to yield:

outbound.example.com
    outbound proxy set identifiers+user name+instance identifier+registration identifier @outbound.example.com; keepalive indicator
    outbound proxy set identifiers+user name+instance identifier+registration identifier @outbound.example.com; opaque URI parameter The home proxy connection table for flow 102*d* includes:

outbound.example.com
    outbound proxy set identifiers+user name+instance identifier+registration identifier @outbound.example.com; keepalive indicator Home proxy 106*b* forwards the invitation response to outbound proxy 104*b* at step 252. Outbound proxy 104*b* updates the outbound proxy 104*b* connection table with URIs from the record route of the invitation response.

Outbound proxy 104*b* fails at step 254. User agent 101 attempts to send a message to home proxy 106 at step 256, but finds that flow 102*a* is severed. To determine a backup flow 102, user agent 101 performs a longest match search of URIs (as described above) at step 258 to find a flow 102 that may be used. User agent 101 determines that flow 102*b* to backup outbound proxy 104*c* can be used, and sends the message along flow 102b at step 260. Home proxy 106 may use a similar procedure to send a message to user agent 101 along flow 102d.

Modifications, additions, or omissions may be made to the methods described herein without departing from the scope of the invention. The method may include more, fewer, or other steps. Additionally, steps may be performed in any suitable order.

An advantage of certain embodiments of the present disclosure may be that an outbound proxy may inform a user agent of an outbound proxy set assigned to the user agent for communication to a home proxy. The user agent may use backup outbound proxies of the outbound proxy set in case of an outbound proxy failure.

Another advantage of certain embodiments may be that the user agent and/or home proxy may maintain connection tables that support a response to mid-dialog failures. A connection table records universal resource identifiers (URIs) that may be used to communicate along flows between the user agent and home proxy. The user agent and/or home proxy may use a connection table to identify a backup flow that may be used in case of an outbound proxy failure.

Other technical advantages of the present disclosure will be readily apparent to one skilled in the art from the following figures, descriptions, and claims. Moreover, while specific advantages have been enumerated above, various embodiments may include all, some, or none of the enumerated advantages.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method, comprising:
    receiving a first registration request at a home proxy, the first registration request received from a first user agent;
    assigning an outbound proxy set to the first user agent, the outbound proxy set comprising a plurality of outbound proxies;
    inserting an outbound proxy set identifier into a first registration response for the first user agent, the outbound proxy set identifier operating to allow:
        the first user agent to identify the plurality of outbound proxies, to select a first outbound proxy from the outbound proxy set, and to register at the first outbound proxy through a second registration request; and
        the first outbound proxy to assign one or more of the other outbound proxies of the outbound proxy set as one or more backup outbound proxies for the first user agent, and to inform the first user agent of the one or more backup outbound proxies through a second registration response; and
    receiving the second registration request at the home proxy from the first outbound proxy selected by the first user agent, the second registration request sent to the first outbound proxy by the first user agent.

2. The method of claim 1, wherein informing the first user agent of the one or more backup outbound proxies through the second registration response further comprises:
    inserting one or more backup outbound proxy addresses of the one or more backup outbound proxies into a portion of the second registration response.

3. The method of claim 1, further comprising:
    registering the first user agent at the one or more backup outbound proxies.

4. The method of claim 1, further comprising:
    determining that the first outbound proxy has failed;
    identifying a backup outbound proxy of the one or more backup outbound proxies; and
    utilizing the identified backup outbound proxy.

5. The method of claim 1, further comprising:
    receiving, at the home proxy, an invitation request for a dialog with a second user agent, the invitation request received from the first outbound proxy selected by the first user agent, the invitation request sent to the first outbound proxy by the first user agent.

6. The method of claim 1, further comprising:
    assigning one or more of the other outbound proxies of the outbound proxy set as one or more backup outbound proxies for the first user agent; and
    informing the first user agent of the one or more backup outbound proxies through a second registration response.

7. An apparatus, comprising:
    a home proxy comprising:
        an interface that operates to:
            receive a first registration request from a user agent; and
            receive a second registration request from a first outbound proxy of a outbound proxy set, the first outbound proxy selected by the user agent, the second registration request sent to the first outbound proxy by the user agent, and
        one or more processors that operates to:
            assign the outbound proxy set to the user agent, the outbound proxy set comprising a plurality of outbound proxies; and
            insert an outbound proxy set identifier into a first registration response for the user agent, the outbound proxy set identifier that operates to allow:
                the user agent to identify the plurality of outbound proxies, to select the first outbound proxy from the outbound proxy set, and to register at the first outbound proxy through a second registration request; and
                the first outbound proxy to assign one or more of the other outbound proxies of the outbound proxy set as one or more backup outbound proxies for the user agent, and to inform the user agent of the one or more backup outbound proxies through a second registration response.

8. The apparatus of claim 7, further comprising the first outbound proxy of the outbound proxy set.

9. The apparatus of claim 8, the first outbound proxy that operates to inform the user agent of the one or more backup outbound proxies through the second registration response by:
    inserting one or more backup outbound proxy addresses of the one or more backup outbound proxies into a portion of the second registration response.

10. The apparatus of claim 8, further comprising the one or more backup outbound proxies, each backup outbound proxy that operates to register the user agent.

11. The apparatus of claim 8, the user agent that operates to:
    determine that the first outbound proxy has failed;
    identify a backup outbound proxy of the one or more backup outbound proxies; and
    utilize the identified backup outbound proxy.

* * * * *